United States Patent
Shimizu et al.

[15] 3,663,355
[45] May 16, 1972

[54] FLAME-PROOF AND NO-SMOKE-PRODUCING PLATE FOR ARCHITECTURAL USE

[72] Inventors: Keisuke Shimizu, 32-15, 2-chome, Wakabayashi, Setagaya-ku, Tokyo; Kiichi Suzuki, 15-9, 1-chome, Yutaka-cho, Shinagawa-ku, Tokyo, both of Japan

[22] Filed: Mar. 23, 1970

[21] Appl. No.: 21,872

[30] Foreign Application Priority Data

May 10, 1969 Japan..................................44/35832

[52] U.S. Cl..............................161/210, 117/12, 117/70 S, 117/138, 161/270, 161/403, 161/413
[51] Int. Cl..........................................................B32b 13/10
[58] Field of Search ................161/210, 270, 403; 117/70 S, 117/12, 138; 106/74, 75, 84, 86

[56] References Cited

UNITED STATES PATENTS

| | | | |
|---|---|---|---|
| 1,271,506 | 7/1918 | Ferguson | 117/138 |
| 2,372,285 | 3/1945 | Marc et al. | 117/70 S |
| 2,549,516 | 4/1951 | Parry | 117/70 S |
| 2,600,812 | 6/1952 | Thomas | 106/84 |
| 2,756,159 | 7/1956 | Kendall et al. | 106/84 |
| 2,998,328 | 8/1961 | Munger et al. | 117/70 S |
| 3,186,888 | 6/1965 | Graeth et al. | 117/138 |
| 3,241,990 | 3/1966 | Harrison | 106/74 |
| 3,424,600 | 1/1969 | Liass et al. | 106/74 |
| 3,450,547 | 6/1969 | Sams et al. | 106/75 |
| 3,522,067 | 7/1970 | MacArthur | 106/84 |

*Primary Examiner*—Robert F. Burnett
*Assistant Examiner*—George W. Moxon, II
*Attorney*—Stevens, Davis, Miller & Mosher

[57] ABSTRACT

A flame-proof and no-smoke-producing wooden plate for architectural use comprising a wooden base plate, a layer of a water-proof composition formed on said wooden plate, a layer of a water-soluble silicate selected from the group consisting of sodium silicate or potassium silicate formed on said layer of said water-proof composition, and an additional layer of a water-proof composition formed on said water-soluble silicate layer. Each of said water-proof compositions is formed by adding to a water-soluble silicate selected from the group consisting of sodium silicate and potassium silicate a dicalcium silicate material which combines with a water-soluble silicate to produce a self-setting mixture.

3 Claims, 3 Drawing Figures

FLAME-PROOF AND NO-SMOKE-PRODUCING PLATE FOR ARCHITECTURAL USE

This invention relates to a wooden plate for architectural use which does not burn and produce smoke when subjected to flames at the time a fire breaks out.

It has hitherto been considered impossible to render plywoods and fiber boards non-inflammable and smokeless because they are made of wood which is an organic substance. The best one can do at present is to treat wooden materials for architectural use so as to render them incombustible as much as possible when subjected to flames. Several methods are available to attain the end of making materials incombustible.

In one method known in the art, plywoods or other materials are impregnated with ammonium phosphate, ammonium sulfate or boric acid so as to reduce their inflammability by utilizing the dehydrating action of these agents to promote carbonization of the materials when subjected to flames at the time a fire breaks out. In another method, plywoods and other materials are immersed in a solution of a halide so as to increase the concentration of halide gases but to reduce the concentration of inflammable gases when such materials burn. These methods may have effect in rendering materials incombustible when the temperature is below 500° C. However, when the temperature of materials rises above 700° C as when subjected to the flames of a fire, the materials treated by these methods produce plenty of smoke and burn explosively. Thus, the conventional methods have almost no effect in preventing the spread of flames when a fire breaks out and reducing the volume of smoke emitted by the materials on fire.

We have found that a layer of sodium silicate or potassium silicate of a certain thickness presents the phenomenon of foam production as the $H_2O$ contained therein vaporizes simultaneously as the surface portion of the layer is melted when subjected to flames. The foam produced is covered with a film of a vitreous material so that the layer of sodium silicate or potassium silicate is expanded to a thickness several times to one hundred and several score times the original thickness. A multitude of gaps provided in the foam which is incombustible as well as white color of the film of a vitreous material has effect in insulating heat and preventing the flames spreading to the material underlying the layer of sodium silicate or potassium silicate.

We have also found that the layer of sodium silicate or potassium silicate has a disadvantage. Such layer is soluble in water so that it is readily dissolved by absorbing water in the air. Such layer also reacts with carbon dioxide in the air with a result that its capacity to produce foam is reduced due to dehydration or it is converted into a carbonate. In the latter case, the surface of the layer turns white and its outer appearance is marred.

We have conducted research in an effort to find a useful composition for rendering plywoods or other building materials incombustible by utilizing a silicate. We have finally succeeded in developing a composition which is free from the disadvantage of sodium silicate or potassium silicate of being water soluble and which yet retains its advantage of foaming. The present invention is the result of an ingeneous and therefore inventive way of thinking.

Accordingly, a main object of the invention is to provide a flame-proof and no-smoke-producing wooden plate for architectural use which comprises a base plate, a layer of a water-soluble silicate such as sodium silicate or potassium silicate and a compact and rigid layer of a water-proof composition formed on said layer, said silicate containing water-proof composition being produced by adding, to sodium silicate, potassium silicate or other water-soluble silicate, 1 to 50 percent of a material such as dicalcium silicate which combines with a water-soluble silicate to produce a water-insoluble sediment or self-setting mixture. In the state, sodium silicate or potassium silicate is kept from coming directly into contact with water and air, so that the foam producing capacity of the silicate layer can be preserved over a prolonged period of time and the surface of such layer can be kept from turning white in color.

Another object of the invention is to provide a flame-proof and no-smoke-producing wooden plate for architectural use which comprises an additional decorative surface layer formed on the compact and rigid layer of a silicate containing water-proof composition by bonding a printed sheet with an inorganic adhesive, adhesively bonding a thin sheet of finely grained wood or directly painting on the compact and rigid layer of a silicate containing water-proof composition.

Additional objects as well as features and advantages of the present invention will be evident from the description set forth hereinafter when considered in conjunction with the accompanying drawings, in which.

Figure 1:
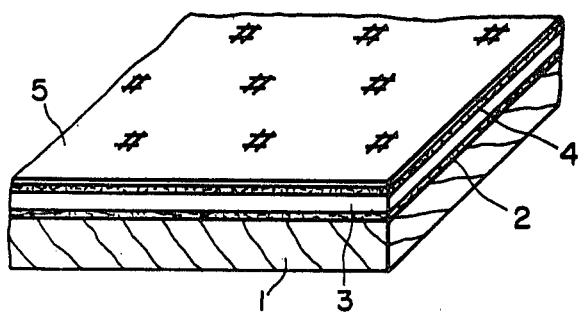
FIG. 1 is a perspective view of one embodiment of this invention.

The flame-proof and no-smoke-producing wooden plate for architectural use according to this invention comprises a compact and rigid water-proof layer 2 formed on a base plate 1 of wooden plywood, wooden fiber plate, fiber board or the like by applying a silicate containing water-proof composition, such silicate containing water-proof composition being produced by adding, to sodium silicate, potassium silicate or other water-soluble silicate, 1 to 50 percent of a material such as dicalcium silicate which combines with a water soluble silicate to produce a water-insoluble sediment or self-setting mixture. The material which combines with sodium silicate, potassium silicate or other silicate to produce a water-insoluble sediment or self-setting mixture so as to cause the same to undergo a dehydration reaction may be selected from salts or oxides of aluminum, magnesium, lead, titanium, chromium, iron, zinc and calcium; silica gel; silicides of iron, copper and calcium; and aldehydes such as glyoxal. The strength of the water-proof layer 2 can be increased by adding, to the silicate containing water-proof composition, an inorganic filler such as pearlite, asbestos short fibers, bentonite or the like. The silicate containing water-proof layer undergoes no changes even when it is immersed in water for 24 hours and remains as compact and rigid as it was before immersion in water. The silicate containing water-proof layer has a very low gas permeability so that carbon dioxide, free oxygen and water in the air cannot pass through this layer. Formed on this silicate containing water-proof layer 2 is an intermediate layer 3 of a water-soluble silicate such as sodium silicate, potassium silicate or the like which constitutes the essential portion of the flame-proof structure of the plate of this invention. The intermediate layer 3 normally remains dry and retains a water content of at least about 20 percent by weight. When exposed to elevated temperatures, say temperatures of about 400° C., for about 10 seconds, the intermediate layer produces foam and its thickness is increased to 10 to over 100 times as great as the original thickness. The intermediate layer in this state is replete with a multitude of discrete particles of foam which are incombustible and heat insulating. Such foaming intermediate layer has a very low heat conductivity and its surface, when subjected to flames of over 560° C., is melted and converted to a tough film so that the foam particles are not scattered by a hot blast caused by flames and stay where they are.

Formed on the intermediate layer 3 is an adhesive layer 4 for adhesively bonding a decorative layer 5 to the intermediate layer 3. The adhesive layer 4 which is formed of the same composition as the silicate containing water-proof composition for forming the water-proof layer 2 functions to adhesively bonding the decorative layer 5 to the intermediate layer 3 and to cooperate with the silicate containing water-proof layer 2 to provide protection to the intermediate layer 3 so as to prevent the latter losing its foaming capacity. In other words, the adhesive layer 4 forms a part of the flame-proof structure which is water-proof and impermeable to gasses.

The material forming the decorative layer 5 may be a sheet of paper or a thin sheet of finely grained wood. Such paper may be selected from the group comprising ordinary printing paper, titanium paper, kraft paper, asbestos paper, resin treated paper and synthetic resin paper. Such paper may be printed and have a coat of a synthetic resinous material applied thereto. The decorative layer 5 also serves the purpose of providing protection to the underlying silicate layer. It also prevents deposition, on the surface of the plate, of white matter which is produced by efflorescence of inorganic material in the underlying layer.

Figure 2:
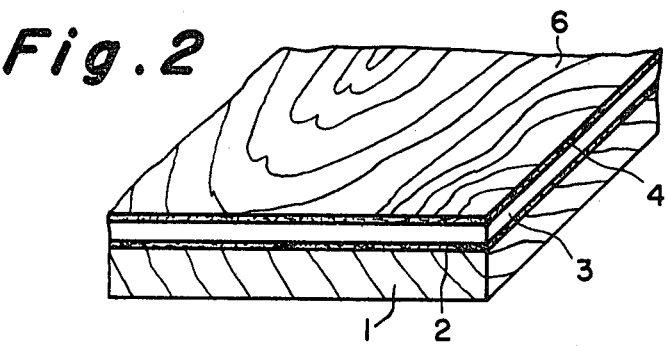
FIG. 2 is a perspective view of another embodiment of this invention.

In place of forming the decorative layer 5 on the water-proof adhesive layer 4, printing may be effected directly on the water-proof adhesive layer 4 as indicated at 6 in FIG. 2. Printing may be effected by any one of known processes including gravure printing, offset printing, flexo printing and silk screen printing. The print applied to the layer 4 may be a wood grain pattern or of any other design in monochrome or natural color. The printing ink used may be one which comprises vinyl chloride or other synthetic resinous material as its principal constituent in order to keep the plate alkali proof.

From the foregoing description, it will be appreciated that according to the present invention, a water-proof composition comprising a water-soluble silicate such as sodium silicate or potassium silicate (the invention will be described hereinafter as using sodium silicate) and a material such as dicalcium silicate (the invention will be described hereinafter as using dicalcium silicate) which combines with a water-soluble silicate to produce a self-setting mixture is applied to a base plate. Viscous sodium silicate is so tacky that the product of reaction between sodium silicate and dicalcium silicate is affixed to the base plate and at the same time an adjacent layer of sodium silicate is also firmly combined to the layer of silicate containing water-proof composition. This arrangement prevents peeling off of the base plate from the sodium silicate layer due to dissolution of the latter. The provision, on the sodium silicate layer, of an additional layer of silicate containing water-proof composition in which sodium silicate is combined with dicalcium silicate has effect in preventing dissolution of sodium silicate by water in the air or water brought into contact therewith by wiping with a moist cloth. The use of the additional water-proof composition layer comprising sodium silicate and dicalcium silicate as an adhesive agent for applying a decorative sheet to the sodium silicate layer results in the decorative sheet being impregnated with a portion of sodium silicate so that the decorative sheet is affixed firmly to the sodium silicate layer and rendered heat resistant. Thus, a flame-resistant and heat-resistant surface is provided on the decorative sheet. At the same time, the presence of water-proof composition prevents exudation of sodium silicate on the surface of the decorative sheet, thereby preventing soiling of the surface of the decorative sheet by a white-colored double salt formed by sodium silicate coming into contact with carbon dioxide in the air.

If printing is effected directly on the water-proof adhesive layer without affixing the decorative sheet thereto, the layer of organic matter such as paper or wood which produces smoke when it burns can be eliminated, thereby without decreasing the flame-proof, no-smoke-producing effect of the plate according to this invention. The absence of the decorative sheet on the sodium silicate layer which is a foaming layer eliminates the influence which would otherwise be exerted by the decorative sheet on the foaming capacity of the sodium silicate layer, making it possible to maximize the thickness of the sodium silicate layer when it foams upon being subjected to flames. This is conducive to increased heat-insulating and flame-proof effect of the plate according to this invention. Some examples of the invention will now be described.

EXAMPLE 1

A composition set forth hereunder was applied by means of a roll coater to a plywood of 4 millimeter thick at a rate of 180 g/m².

| | Weight % |
|---|---|
| Sodium Silicate (40 degrees Baume) | 100 |
| Dicalcium Silicate | 30 |
| Asbestos | 5 |
| Pearlite | 5 |

Then, sodium silicate (42 degrees Baume) was applied by means of a flow coater to the layer of said composition at a rate of 1,350 g/m². Applied to the layer of sodium silicate by means of a roll coater at a rate of 180 g/m² is an adhesive layer of the following composition.

| | Weight % |
|---|---|
| Potassium Silicate (38 degrees Baume) | 100 |
| Dicalcium Silicate | 20 |
| Talc | 10 |

A sheet of titanium paper printed with a pattern as desired was affixed to said adhesive layer, and the assembly was compressed and finished.

The plate produced by the aforementioned process according to this invention was allowed to stand for 24 hours in a desiccator of 40° C. and 100 percent RH, but showed no changes in surface conditions. The plate was also allowed to stand for 30 days in a carbon dioxide atmosphere of one atmospheric pressure. No phenomenon was noted of deposition of white matter on the surface caused by carbon dioxide in the air.

EXAMPLE 2

A composition as set forth hereunder was applied to the surface of a plywood by means of a roll coater at a rate of 300 g/m².

| | Weight % |
|---|---|
| Potassium Silicate (38 degrees Baume) | 100 |
| Dicalcium Silicate | 30 |
| Asbestos Short Fibers | 10 |
| Pearlite | 5 |

Then, potassium silicate (42 degrees Baume) was applied by means of a flow coater to the layer of said composition at a rate of 1,000 g/m². Said composition was again applied by means of a roll coater at a rate of 270 g/m² to said potassium silicate layer and dried.

Two-color printing was directly effected on the second layer of said composition by means of a gravure offset printing machine, and then a paint of the amino resin system was applied to the printed surface at a rate of 20 g/m², dried and finished.

Figure 3:
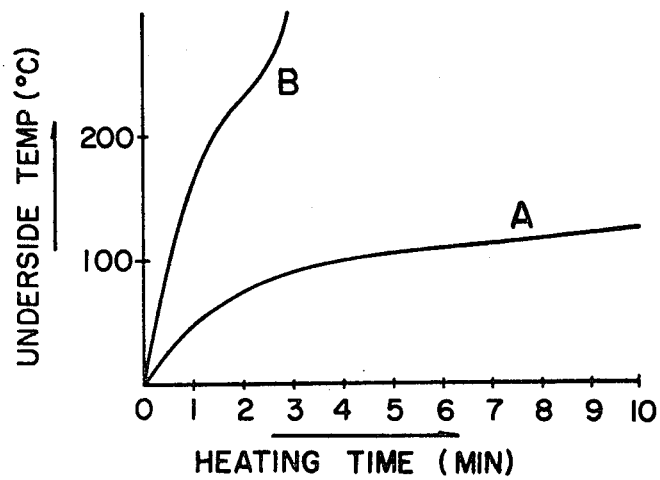
FIG. 3 is a diagrammatic representation of the underside temperature-heating time characteristics of the plate according to this invention in comparison with those of a conventional plate.

The flame-proof and no-smoke-producing plates produced by the example described above was directly heated by flames of about 600° C. by subjecting the surface of such plates to the flames emitted by a Bunsen burner. A curve A of FIG. 3 represents a rise in temperature in the central portion of the underside of the plates in relation to time. It will be seen that as compared a rise in temperature in relation to time of conventional plates which is represented by a curve B, the rise in temperature is markedly low, thereby showing that the plates according to this invention are highly non-inflammable.

No smoke was produced by the plates of this invention when subjected to flames.

What is claimed is:

1. A flame-proof and no-smoke-producing wooden plate for architectural use comprising:
   a wooden base plate,
   a layer of a water-proof composition formed on said wooden plate,
   a layer of a foamable water-soluble silicate selected from the group consisting of sodium silicate and potassium silicate formed on said layer of said water-proof composition, and an additional layer of a water-proof composition formed on said waterosoluble silicate layer, each said water-proof composition being formed by adding to a foamable water-soluble silicate selected from the group consisting of sodium silicate and potassium silicate a dicalcium silicate material in an amount from about 1 percent to about 50 percent which combines with a water-soluble silicate to produce a self-setting mixture.

2. The flame-proof and no-smoke-producing wooden plate for architectural use of claim 1 further comprising a decorative surface layer formed by affixing a printed sheet on said additional layer of said water-proof composition which serves as an adhesive layer.

3. The flame-proof and no-smoke-producing wooden plate for architectural use of claim 1 wherein printing is effected directly on the uppermost layer of said water-proof composition so as to provide a decorative pattern of any design as desired on the surface of the plate.

* * * * *